US011939941B2

(12) United States Patent
Spakowski

(10) Patent No.: US 11,939,941 B2
(45) Date of Patent: Mar. 26, 2024

(54) GASOLINE DIRECT INJECTION FUEL PUMP WITH ISOLATED PLUNGER SLEEVE

(71) Applicant: DELPHI TECHNOLOGIES IP LIMITED, St. Michael (BB)

(72) Inventor: Joseph G. Spakowski, Rochester, NY (US)

(73) Assignee: DELPHI TECHNOLOGIES IP LIMITED, St. Michael (BB)

(*) Notice: Subject to any disclaimer, the term of this patent is extended or adjusted under 35 U.S.C. 154(b) by 0 days.

(21) Appl. No.: 17/703,170

(22) Filed: Mar. 24, 2022

(65) Prior Publication Data

US 2023/0304462 A1 Sep. 28, 2023

(51) Int. Cl.
*F02M 59/02* (2006.01)
*F02M 59/10* (2006.01)
*F04B 1/0439* (2020.01)
*F04B 19/22* (2006.01)
*F04B 53/04* (2006.01)
*F04B 53/16* (2006.01)
(Continued)

(52) U.S. Cl.
CPC ........ *F02M 59/025* (2013.01); *F02M 59/102* (2013.01); *F04B 1/0439* (2013.01); *F04B 19/22* (2013.01); *F04B 53/04* (2013.01); *F04B 53/168* (2013.01); *F04B 1/0408* (2013.01); *F04B 1/0421* (2013.01); *F04B 11/0033* (2013.01)

(58) Field of Classification Search
CPC .... F04B 1/0421; F04B 1/0439; F04B 1/0408; F04B 11/0033; F04B 19/22; F04B 53/04; F04B 53/166; F04B 53/168; F02M 59/025; F02M 59/102; F02M 59/442; F16J 15/182; F16C 29/02
See application file for complete search history.

(56) References Cited

U.S. PATENT DOCUMENTS 8,579,611 B2 * 11/2013 Lucas .................... F02M 59/48 417/470
10,890,151 B2 * 1/2021 Tokumaru ............ F02M 59/442
(Continued)

FOREIGN PATENT DOCUMENTS

WO 2006069819 A1 7/2006
WO WO-2006069819 A1 * 7/2006 ............ F04B 1/0404

*Primary Examiner* — Devon C Kramer
*Assistant Examiner* — Joseph S. Herrmann
(74) *Attorney, Agent, or Firm* — WARNER NORCROSS + JUDD LLP

(57) ABSTRACT

An improved high-pressure fuel pump for a gasoline direct injection system is provided. The fuel pump includes a pump body defining a low-pressure side, a high-pressure side, and a pumping chamber therebetween. The pump body also defines a central bore and a drain port extending from the central bore to the low-pressure side. A slip-fit sleeve is clamped within the central bore, the slip-fit sleeve including upper and lower guide ribs. A plunger is moveable within the sleeve for compressing fuel within the pumping chamber. The plunger and the sleeve define a first diametral clearance, and the guide ribs and the central bore define a second diametral clearance. Fuel diverting around the upper guide rib during pumping operations can recirculate through the drain port to the low-pressure side. To accommodate thermal expansion of the sleeve, the second diametral clearance is at least 75% of the first diametral clearance.

18 Claims, 6 Drawing Sheets
(1 of 6 Drawing Sheet(s) Filed in Color)

(51) Int. Cl.

| | |
|---|---|
| *F04B 1/0408* | (2020.01) |
| *F04B 1/0421* | (2020.01) |
| *F04B 11/00* | (2006.01) |

(56) References Cited

U.S. PATENT DOCUMENTS

| | | | | |
|---|---|---|---|---|
| 2004/0052652 | A1* | 3/2004 | Yamada | F04B 49/243 417/440 |
| 2008/0019853 | A1* | 1/2008 | Hashida | F02M 59/265 417/490 |
| 2010/0047084 | A1* | 2/2010 | Hokkanen | F02M 59/102 417/213 |
| 2011/0253109 | A1* | 10/2011 | Usui | F02M 39/02 123/509 |
| 2013/0061830 | A1 | 3/2013 | Hornby et al. | |
| 2014/0050597 | A1 | 2/2014 | Absmeier et al. | |
| 2020/0049116 | A1* | 2/2020 | Tokumaru | F04B 53/168 |

* cited by examiner

| INNER GAP/ OUTER GAP | Total Gap | Time to fail/pass test |
|---|---|---|
| | μm | s |
| 11 μm / 0 μm | 11 | 15.5 |
| 11 μm / 3 μm | 14 | 19.2 |
| 11 μm / 6 μm | 17 | 26.2 |
| 11 μm / 8 μm | 19 | 120+ |
| 11 μm / 10 μm | 21 | 120+ |
| 11 μm / 14 μm | 25 | 120+ |

FIG. 5

Intial 25 μm total gap:
Temperature at t = 120 s

Intial 14 μm total gap:
Temperature at t = 20 s

GASOLINE DIRECT INJECTION FUEL PUMP WITH ISOLATED PLUNGER SLEEVE

FIELD OF THE INVENTION

The present invention relates to fuel pumps, and more particularly, high-pressure fuel pumps for gasoline direction injection systems.

BACKGROUND OF THE INVENTION

Gasoline direction injection (GDI) is a type of fuel injection in which gasoline is highly pressurized and delivered directly into the combustion chamber of each cylinder. The resultant air-fuel mixture helps cool the combustion chamber, yielding an improved compression ratio and greater fuel efficiency over alternative fuel injection systems.

GDI systems generally include an engine-mounted high-pressure fuel pump for pressurizing fuel that is received from a low-pressure lift pump within the fuel tank. The high-pressure fuel pump must be carefully engineered to deliver high pressure fuel to multiple fuel injectors via a fuel rail at pressures that exceed the compression pressure inside each cylinder. High-pressure fuel pumps are typically mechanical pumps that are operated by the camshaft. A dedicated cam operates a plunger within the fuel pump, and a built-in flow control valve regulates fuel flow into the pump's working chamber to control fuel pressure at the fuel pump outlet.

More specifically, existing GDI high-pressure pumps include a stainless steel sleeve that is assembled into a pump body. Assembly of the sleeve into the body is highly critical. The sleeve is typically press-fit into a central bore in the pump body, and the sleeve can include a crimped end portion. However, insertion of the sleeve within the bore of the pump body can cause distortions in the sleeve. These distortions can reduce or eliminate the radial clearance between the plunger and the sleeve, which can lead to pump seizures. In addition, when the sleeve is rigidly interfaced with the inner diameter of the bore, the sleeve is not free to change thermally as the pump heats up from operation. The outer diameter of the plunger will expand as it heats up, and the outer diameter of the sleeve will attempt to expand as the sleeve heats up, but this expansion is prevented by the pump body. This forces the sleeve to expand radially inward as the plunger grows radially outward, resulting in a loss of radial clearance between the plunger and the sleeve, and ultimately causing seizure of the high-pressure fuel pump.

Accordingly, there remains a continued need for an improved GDI high-pressure fuel pump that minimizes the incidence of pump seizures. In particular, there remains a continued need for an improved GDI high-pressure fuel pump that eliminates or reduces seizures caused by assembly distortion and/or thermal growth restrictions during normal operating conditions.

SUMMARY OF THE INVENTION

An improved high-pressure fuel pump for a gasoline direct injection system is provided. The fuel pump includes a pump body defining a low-pressure side, a high-pressure side, and a pumping chamber therebetween. The pump body also defines a central bore and a drain port extending from the central bore to the low-pressure side. A slip-fit sleeve is clamped within the central bore, the slip-fit sleeve including upper and lower guide ribs. A plunger is moveable within the sleeve for compressing fuel within the pumping chamber. The plunger and the sleeve define a first diametral clearance, and the guide ribs and the central bore define a second diametral clearance. Fuel diverting around the upper guide rib during pumping operations can recirculate through the drain port to the low-pressure side. To accommodate thermal expansion of the sleeve, the second diametral clearance is at least 75% of the first diametral clearance.

In one embodiment, the upper and lower guide ribs are circumferentially disposed about the exterior of the sleeve. The upper and lower guide ribs are separated by an intermediate portion having an outer diameter that is less than an outer diameter of the upper and lower guide ribs. The inner annular surface of the sleeve includes a constant diameter along its entire length. The pump body further defines a vertical relief path on the low-pressure side that extends parallel to the lengthwise axis of the central bore, in fluid communication with a damper volume. The drain port is angled upwardly relative to this lengthwise axis to interconnect the central bore with the vertical relief path. Further, the drain port is disposed between the upper and lower guide ribs.

In these and other embodiments, the slip-fit sleeve eliminates or mitigates the potential for assembly distortion and accommodates thermal expansion. The guide ribs are axially offset from each other and aid in the installation and alignment of the sleeve. A crimped portion of the pump body clamps the sleeve, which is self-centered in the pump bore. At the top of the sleeve, the clamping force compresses the sleeve against the pump body, creating a metal-on-metal sealing interface. Further, the second diametral clearance (outer gap) allows for high-pressure fuel that might leak internally to drain back to the low-pressure side via the drain port.

These and other features and advantages of the present invention will become apparent from the following description of an embodiment of the invention, when viewed in accordance with the accompanying drawings and appended claims. It will be appreciated that any of the preferred and/or optional features of the invention may be incorporated alone, or in appropriate combination, within embodiments of the invention, while still falling within the scope of claim 1, even if such combinations are not explicitly claimed in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 is a table depicting the time-to-fail as a function of the total gap between the plunger, the sleeve, and the pump body.

DETAILED DESCRIPTION OF THE CURRENT EMBODIMENT

Figure 1:
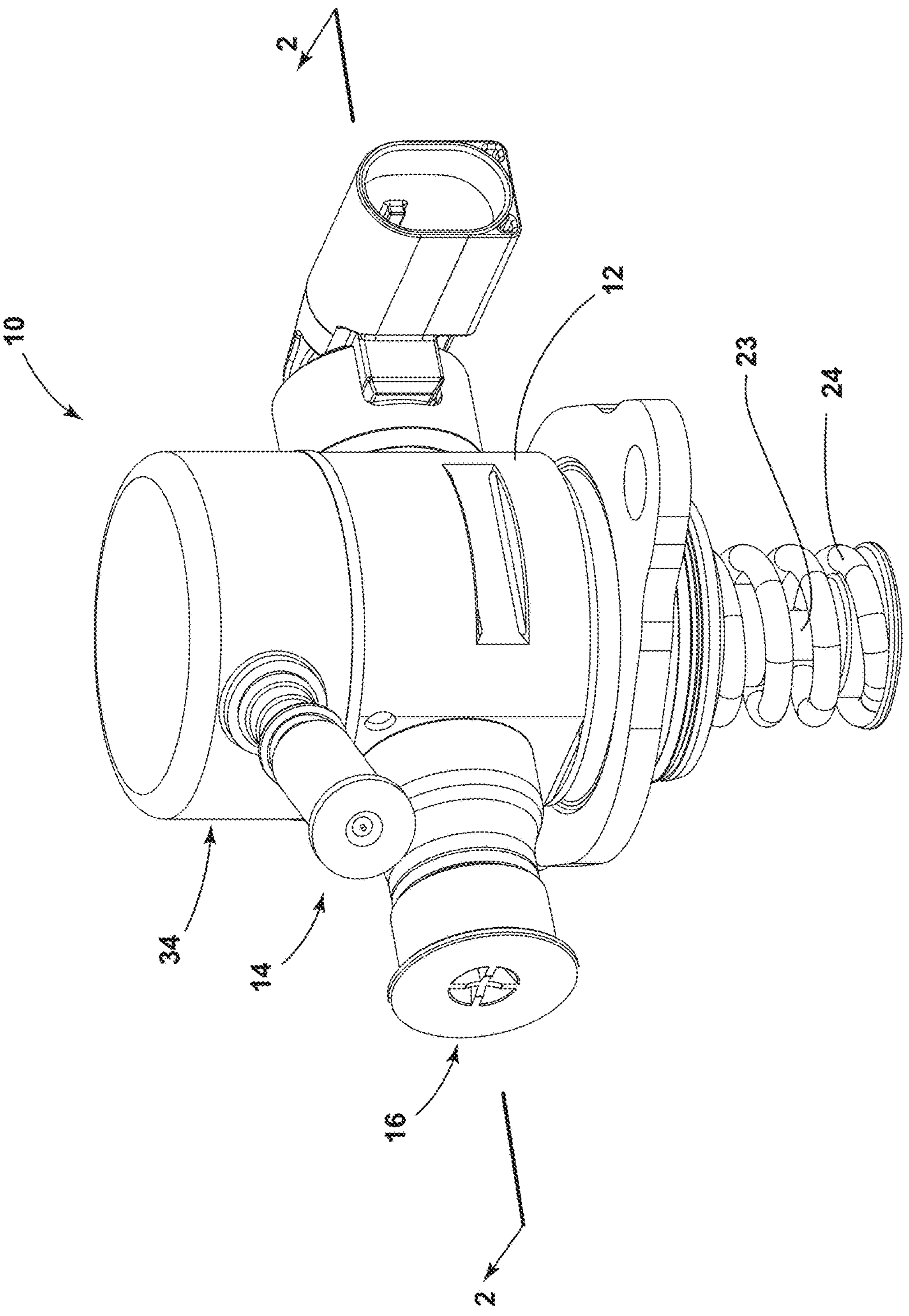
FIG. 1 is a perspective view of a high-pressure fuel pump in accordance with one embodiment of the invention.

Referring now to FIGS. 1-4, a high-pressure fuel pump for a direct injection system in accordance with one embodiment is illustrated and generally designated 10. The fuel pump 10 includes a body 12, a low-pressure inlet 14, and a high-pressure outlet 16. An internal plunger 18 is provided between a low-pressure region and a high-pressure region and is driven by a camshaft to bring fuel to the required pressure levels for output to a fuel rail. As discussed below, the plunger 18 is moveable within a sleeve 20 that is constructed to reduce seizures caused by assembly distortion and/or thermal growth restrictions. The fuel pump 10 is described in Part I below, and its assembly and operation are described in Part II below. While primarily described in connection with gasoline direct injection systems, the fuel pump can be used in other systems as desired.

I. Fuel Pump Overview

As noted above, the fuel pump 10 includes a body 12, a low-pressure inlet 14, a high-pressure outlet 16, a plunger 18, and a sleeve 20. The sleeve 20 is coaxial with the plunger 18 and surrounds the plunger 18 along a portion of its length. The sleeve 20 is seated within a central bore 22 in the body 12, and the plunger 18 is reciprocated within the sleeve 20 by a camshaft (not shown) and a return spring 24. The plunger 18 includes a head portion 21 and a stem portion 23, the head portion 21 having a larger outer diameter than the stem portion 23. The plunger 18 includes a plunger tip 25 at an axial end thereof for engagement with a follower for following a lobe of the camshaft. The body 12 further defines a pumping chamber 26 above the plunger 18 for compressing fuel therein.

Figure 2:
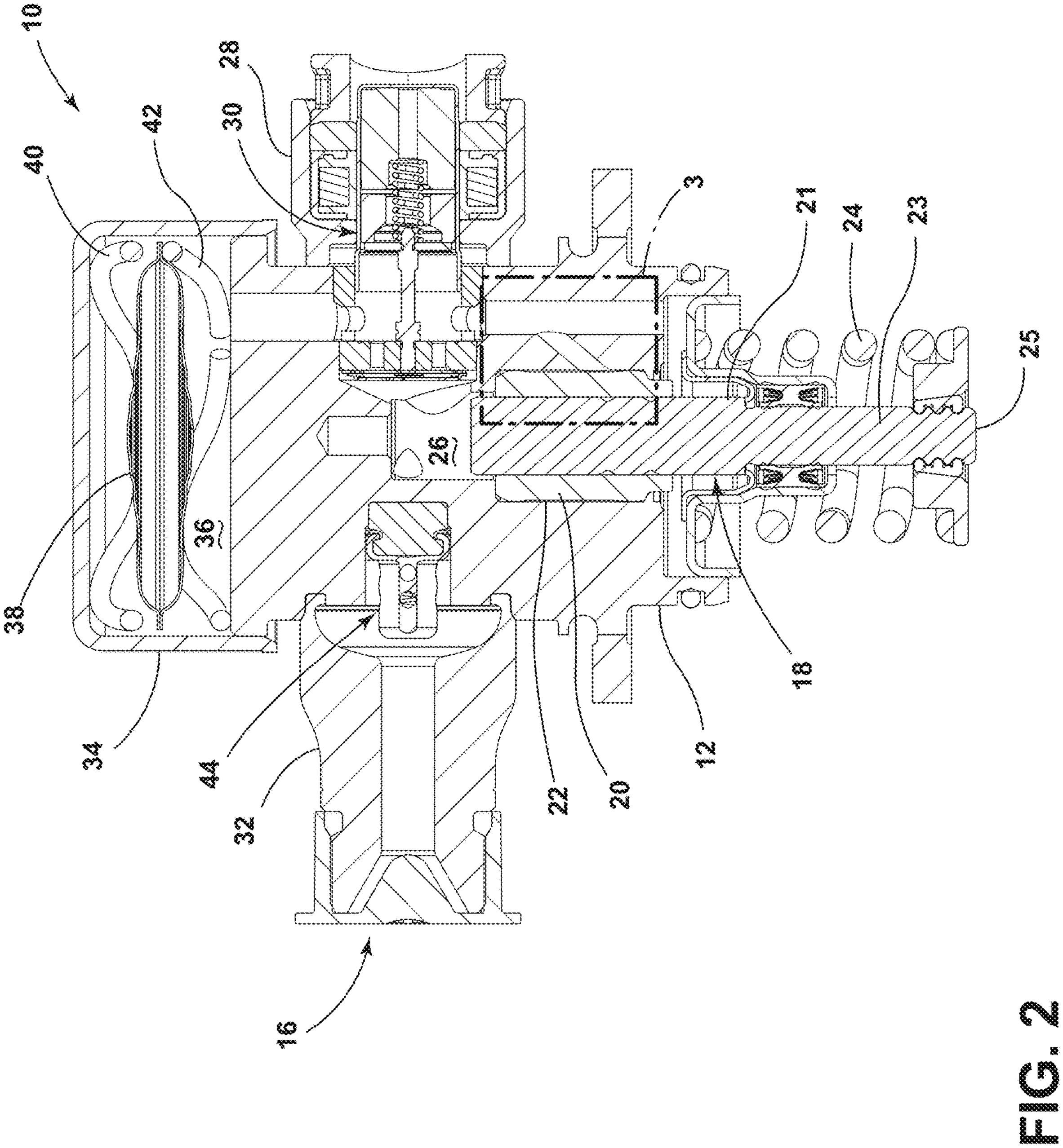
FIG. 2 is a first cross-sectional view of the high-pressure fuel pump of FIG. 1, illustrating a slip-fit sleeve within a bore in the fuel pump body.

As also shown in FIG. 2, the fuel pump 10 includes a valve body 28 that houses a fuel control valve 30, the fuel control valve 30 being opposite of an outlet fitting 32. The fuel control valve 30 may comprise, by not limiting example, a solenoid-operated valve which is controlled by an engine control unit (ECU) to regulate fuel rail pressure. The fuel pump 10 also includes a damper assembly 34 which, during operation of the pump 10, dampens pressure pulsations that occur as a result of movement of the plunger 18. For this purpose, the damper assembly 34 includes a damper volume 36 having a pulsation damper 38 between first and second spiral springs 40, 42. The fuel pump also includes an outlet check valve 44 which opens when a minimum predetermined pressure is achieved in the pumping chamber 26 in the manner discussed below.

Figure 3:
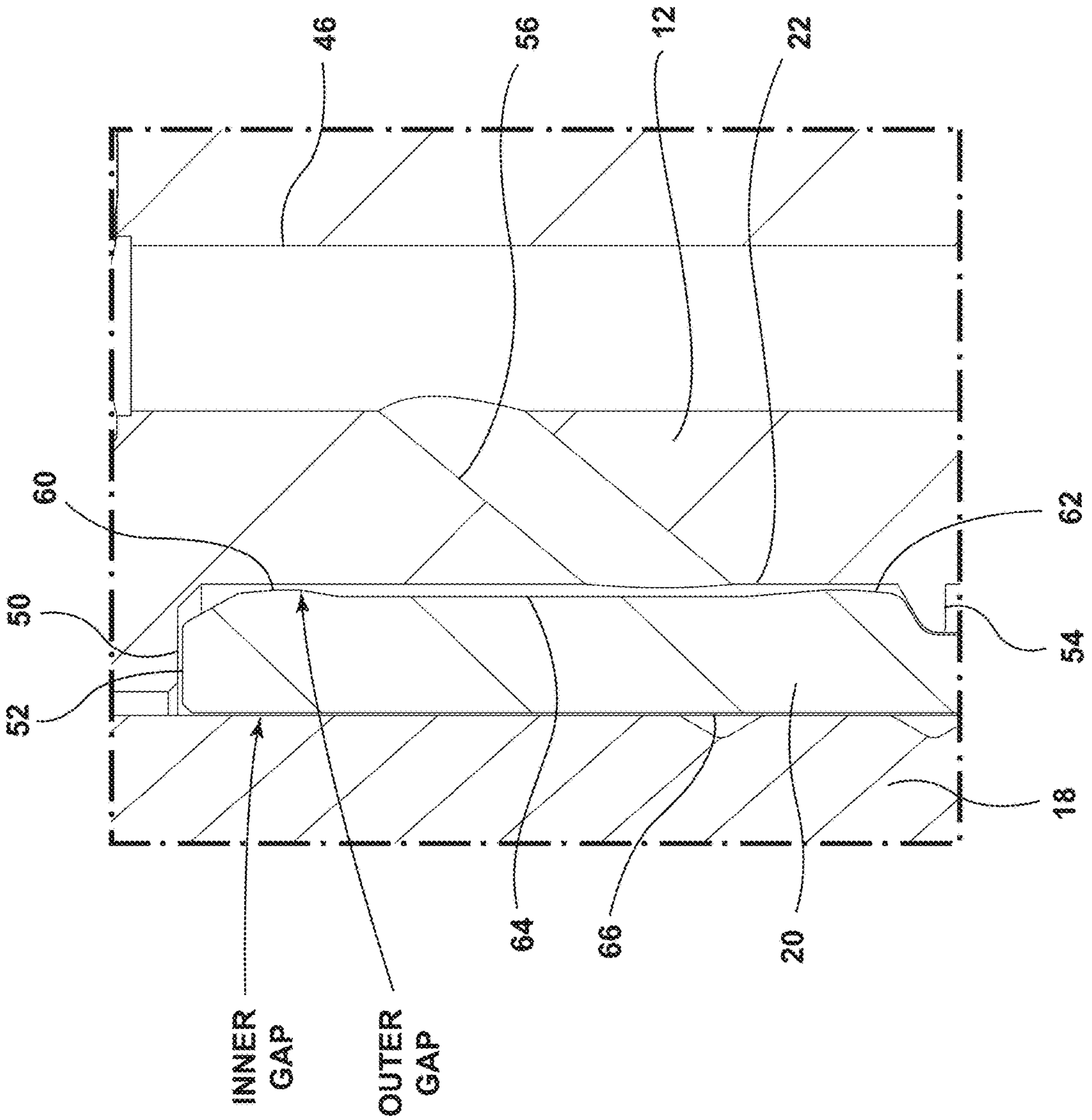
FIG. 3 is a close-up view of the high-pressure fuel pump of FIG. 2, illustrating the drain port extending from the bore in the fuel pump body.
Figure 4:
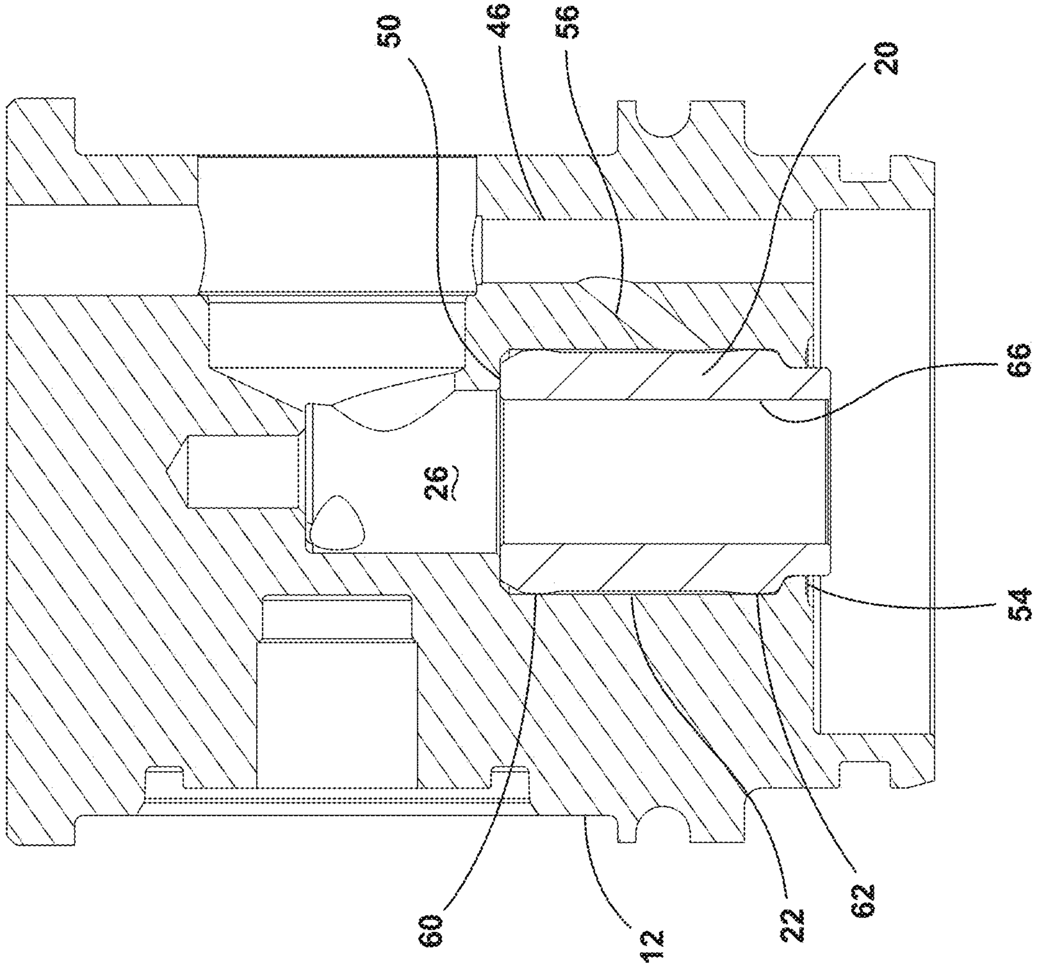
FIG. 4 is a second cross-sectional view of the high-pressure fuel pump of FIG. 1 illustrating the slip-fit sleeve within a bore in the fuel pump body.

As more specifically shown in FIGS. 3-4, the body 12 of the fuel pump 10 defines a vertical relief path 46 on the low-pressure side of the fuel pump 10 and parallel to lengthwise axis of the plunger 18. The relief path 46 is in fluid communication with the pumping chamber 26 and the damper volume 36. The bore 22 includes an enlarged inner diameter relative to the inner diameter of the pumping chamber 26, such that an annular shelf 50 is formed in the fuel pump body 12. The upper axial end 52 of the sleeve 20 abuts the annular shelf 50, while a distal portion of the sleeve 20 is constrained by an inwardly crimped portion 54 of the body 12. The crimped portion 54 of the body provides a rigid axial load to clamp the sleeve 20 to the body 12. This axial load also prevents rotation of the sleeve 20 respect to the body 12. The body 12 also defines a drain port 56 between the bore 22 and the relief path 46. The drain port 56 is angled upwardly in the illustrated embodiment, interconnecting the relief path 46 with the radial gap between the outer diameter (OD) of the sleeve 20 and the inner diameter (ID) of the bore 22.

As further shown in FIG. 3-4, the outer annular surface of the sleeve 20 includes upper and lower guide ribs 60, 62 at upper and lower end portions thereof. The upper and lower guide ribs 60, 62 are separated by a constant-diameter intermediate portion 64 of the sleeve 20. The upper and lower guide ribs 60, 62 having a maximum OD that is greater than the maximum OD of the intermediate portion 64. In addition, the upper and lower guide ribs 60, 62 are beveled and then rounded when viewed in cross-section. The guide ribs 60, 62 can include other geometries in other embodiments, including for example a purely rounded geometry or a purely beveled geometry. The inner annular surface 66 of the sleeve 20 includes a constant ID along its entire length, defining a smooth surface opposite the exterior annular surface of the plunger 18.

The ID of the bore 22, the OD and ID of the sleeve 20, and the OD of the plunger 18 are carefully dimensioned to accommodate assembly and thermal expansion during use. The pump 10 defines a first diametral clearance between the OD of the plunger 18 and the ID of the sleeve 20 (i.e., “the inner gap”). The pump defines a second diametral clearance between the OD of the guide ribs 60, 62 and the ID of the cylindrical sidewall of the bore 22 (i.e., “the outer gap”). As used herein “diametral clearance” means the difference between two diameters, i.e., twice the radial clearance between two surfaces. The first diametral clearance (inner gap) is less than or equal to 14 μm, above which the pump 10 experiences efficiency losses. The second diametral clearance is selected to allow the sleeve 20 to grow thermally without being restricted by the body bore 22. The second diametral clearance (outer gap) is at least 75% of the first diametral clearance (inner gap). For example, the ratio of the first diametral clearance (inner gap) to the second diametral clearance (outer gap) can be from 1:0.7 to 1:4. Depending on the first diametral clearance, the second diametral clearance can be 8 μm to 32 μm inclusive, optionally 8 μm to 26 μm inclusive, still further optionally 8 μm to 14 μm inclusive (as used herein, “inclusive” means inclusive of the upper and lower bounds of the recited range). The cumulative diametral clearance can be at least 19 μm, further optionally at least 21 μm. As discussed below, testing of the relative clearances confirmed the delay or elimination of pump seizures over prior designs.

II. Fuel Pump Assembly and Operation

Assembly of the high-pressure fuel pump 10 includes the “slip-fit” insertion of the sleeve 20 with the body bore 22. Once the sleeve 20 is inserted into the body bore 22 and centered, the lower-most portion of the body bore 22 is crimped inwardly to clamp the sleeve 20 against the annular shelf 50. The resultant axial load prevents rotation of the sleeve 20, however the sleeve 20 is allowed to thermally expand within the body bore 22. The diameter of the inner annular surface 66 of the sleeve 20 is then fixed by a honing machine to achieve the desired inner gap, optionally 11 μm. The body 12 is optionally formed from stainless steel, for example 415 stainless steel, and the sleeve 20 is optionally formed from 440 stainless steel, however other materials can be used in other embodiments. The plunger 18 is then inserted into the sleeve 20 and is operatively connected to a camshaft for reciprocal movement within the pump body 12.

In operation, fuel from an in-tank lift pump is received at the fuel inlet 14. During a suction stroke of the plunger 18, fuel is delivered into the pumping chamber 26. The fuel control valve 30 opens during this time due to the fuel control valve 30 being held open by suction (aided by a spring force). This results in lower pressure in the pumping chamber 26 as compared to the fuel inlet 14, and fuel flows into the pumping chamber 26. If the fuel control valve 30 remains de-energized during the upward stroke of the plunger 18, the fuel control valve 30 remains open, preventing the pump 10 from developing pressure. If however the fuel control valve 30 is energized during the upward stroke of the plunger 18, the fuel control valve 30 closes and the fuel inlet 14 is sealed off from the pumping chamber 26. This allows high pressure to be developed in the pumping chamber 26. Once enough high pressure has been developed in the pumping chamber 26, the outlet check valve 44 opens, and pressurized fuel is delivered to the fuel rail.

Figure 6:
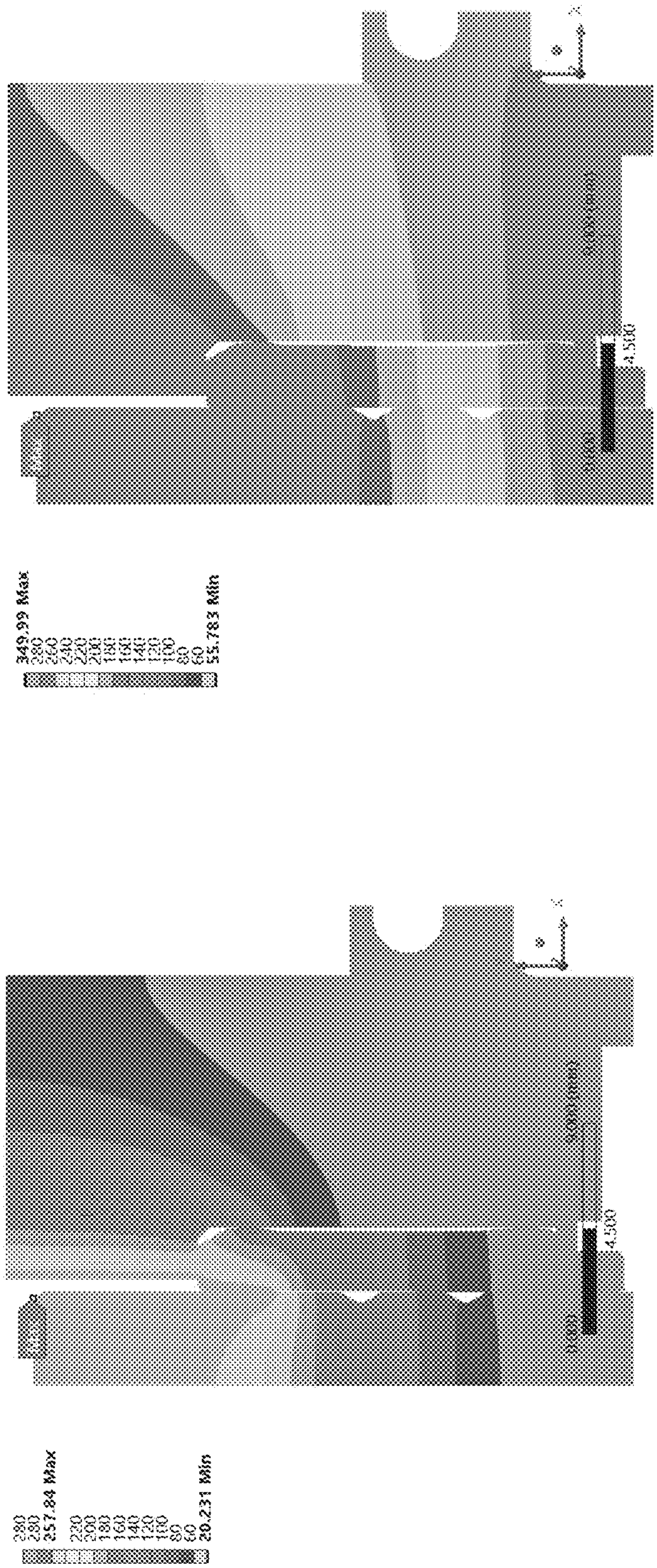
FIG. 6 is a computer model of temperature of the plunger, the sleeve, and the pump body for a pump having a total gap of 14 μm and a pump having a total gap of 25 μm.

Computer modeling confirmed the delay or elimination of pump seizures relative to prior designs. As shown in FIG. 5, for example, the time-to-failure was modeled for a high-pressure fuel pump having an inner gap of 11 μm and an outer gap that varied from 0 μm to 25 μm. The "total gap" indicates the sum of the inner gap and the outer gap, the total gap varying from 11 μm to 25 μm. The initial and ambient temperature of the system was set to 20° C., and heat generation was modeled at 2000 pump-RPM. As shown in FIG. 5, the time-to-failure was 15.5 seconds for an outer gap of 0 μm, 19.2 seconds for an outer gap of 3 μm, and 26.2 seconds for an outer gap of 6 μm. For an outer gap of at least 8 μm, the computer model exhibited no failure (the computer model stopped at 120 seconds, with no failure for an outer gap of 8 μm, 10 μm, and 14 μm). The thermal distribution for row 2 (14 μm total gap) of FIG. 5 and row 6 (25 μm total gap) of FIG. 5 is shown in FIG. 6. With a total gap of 14 μm, the plunger/sleeve interface seized by 20 seconds at a maximum temperature of 260° C. With a total gap of 25 μm, however, the plunger/sleeve interface operated beyond 120 seconds while withstanding a maximum temperature of 350° C. The foregoing computer model demonstrated the ability of the present invention to thermally expand, which is made possible, in part, by the low pressure drain port 56, which allows for high-pressure fuel passing around the upper rib 60 to escape to the relief path 46.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of any claims to the specific elements illustrated or described in connection with this embodiment. Any reference to elements in the singular, for example, using the articles "a," "an," "the," or "said," is not to be construed as limiting the element to the singular. Also, the terminologies "upper," "lower", "above", "below", etc. are intended for clarity of information while describing the embodiments as shown in the figures and are not to be construed as limiting the relationships between the geometric features of this invention.

The invention claimed is:

1. A fuel pump comprising:

a pump body defining a central bore and a pumping chamber therein;

a plunger, moveable within the central bore of the pump body, the plunger being mechanically actuated for compressing fuel within the pumping chamber; and a sleeve within the central bore and surrounding the plunger along a lengthwise portion thereof, the sleeve including a cylindrical sidewall and upper and lower guide ribs, the upper and lower guide ribs being outwardly convex and circumferentially disposed about an exterior of the sleeve and being spaced apart from each other, the upper and lower guide ribs being integrally formed with the cylindrical sidewall, the sleeve and the pump body being formed from metal such that an upper axial surface of the sleeve abuts the pump body creating a metal-on-metal sealing interface;

wherein an outer diameter of the plunger and an inner diameter of the sleeve define a first diametral clearance, and wherein an outer diameter of the upper and lower guide ribs and an inner diameter of the central bore define a second diametral clearance, the second diametral clearance being at least 75% of the first diametral clearance to accommodate thermal expansion of the sleeve;

wherein the pump body further defines a drain port in fluid communication with the central bore, such that fuel diverting around the upper guide rib during pumping operations can recirculate through the drain port to a low-pressure portion of the pump body;

wherein the upper and lower guide ribs are separated by an intermediate portion of the sleeve, the intermediate portion defining an outer diameter less than the outer diameter of the upper and lower guide ribs.

2. The fuel pump of claim 1, wherein the pump body defines a crimped portion that clamps the sleeve in position within the pump body and that prevents rotation of the sleeve.

3. The fuel pump of claim 1, wherein a cross-section of each of the upper and lower guide ribs includes an angled surface that transitions to a rounded surface.

4. The fuel pump of claim 1, wherein a ratio of the first diametral clearance to the second diametral clearance is between 1:0.75 and 1:4, inclusive.

5. The fuel pump of claim 1, wherein the second diametral clearance is between 8 μm to 32 μm, inclusive.

6. The fuel pump of claim 1, wherein a cumulative diametral clearance of the first diametral clearance and the second diametral clearance is at least 19 μm.

7. The fuel pump of claim 1, wherein the inner diameter of the sleeve is constant along a lengthwise axis thereof.

8. A fuel pump comprising:

a pump body defining a low-pressure side, a high-pressure side, and a pumping chamber therebetween, the pump body further defining a central bore and a drain port extending from the central bore to the low-pressure side;

a sleeve within the central bore, the sleeve including upper and lower guide ribs and a cylindrical sidewall, the upper and lower guide ribs being outwardly convex and circumferentially disposed about an exterior of the sleeve, the upper and lower guide ribs being integrally formed with the cylindrical sidewall and axially spaced apart from each other, the sleeve being clamped in position with the central bore by a crimped portion of the pump body, the sleeve and the pump body being formed from metal such that an upper axial surface of the sleeve abuts the pump body to achieve a metal-on-metal sealing interface; and a plunger, moveable within the sleeve, the plunger being mechanically actuated for compressing fuel within the pumping chamber;

wherein an outer diameter of the plunger and an inner diameter of the sleeve define a first diametral clearance, and wherein an outer diameter of the upper and lower guide ribs and an inner diameter of the central bore define a second diametral clearance, the second diametral clearance being at least 75% of the first diametral clearance to accommodate thermal expansion of the sleeve;

wherein the upper and lower guide ribs are separated by an intermediate portion of the sleeve, the intermediate portion defining an outer diameter less than the outer diameter of the upper and lower guide ribs.

9. The fuel pump of claim 8, wherein a ratio of the first diametral clearance to the second diametral clearance is between 1:0.75 and 1:4, inclusive.

10. The fuel pump of claim 8, wherein the second diametral clearance is between 8 μm to 32 μm, inclusive.

11. The fuel pump of claim 8, wherein a cumulative diametral clearance of the first diametral clearance and the second diametral clearance is at least 19 μm.

12. The fuel pump of claim 8, wherein the drain port is disposed between the upper and lower guide ribs.

13. The fuel pump of claim 8, wherein the inner diameter of the sleeve is constant along a lengthwise axis thereof.

14. A fuel pump comprising:

a pump body defining a central bore and a pumping chamber therein;

a plunger, moveable within the central bore of the pump body, the plunger being mechanically actuated for compressing fuel within the pumping chamber; and a sleeve within the central bore and surrounding the plunger along a lengthwise portion thereof, the sleeve including upper and lower guide ribs, the upper and lower guide ribs being circumferentially disposed about an exterior of the sleeve and being spaced apart from each other;

wherein an outer diameter of the plunger and an inner diameter of the sleeve define a first diametral clearance, and wherein an outer diameter of the upper and lower guide ribs and an inner diameter of the central bore define a second diametral clearance, the second diametral clearance being at least 75% of the first diametral clearance to accommodate thermal expansion of the sleeve;

wherein the pump body further defines a drain port in fluid communication with the central bore, such that fuel diverting around the upper guide rib during pumping operations can recirculate through the drain port to a low-pressure portion of the pump body;

wherein the upper and lower guide ribs are separated by an intermediate portion of the sleeve, the intermediate portion defining an outer diameter less than the outer diameter of the upper and lower guide ribs;

wherein the pump body further defines a vertical relief path that extends parallel to a lengthwise axis of the central bore, the drain port interconnecting the central bore and the vertical relief path.

15. The fuel pump of claim 14, wherein the drain port is angled upwardly relative to the lengthwise axis of the central bore.

16. A fuel pump comprising:

a pump body defining a low-pressure side, a high-pressure side, and a pumping chamber therebetween, the pump body further defining a central bore and a drain port extending from the central bore to the low-pressure side;

a sleeve within the central bore, the sleeve including upper and lower guide ribs, the upper and lower guide ribs being circumferentially disposed about an exterior of the sleeve, the sleeve being clamped in position with the central bore by a crimped portion of the pump body; and a plunger, moveable within the sleeve, the plunger being mechanically actuated for compressing fuel within the pumping chamber;

wherein an outer diameter of the plunger and an inner diameter of the sleeve define a first diametral clearance, and wherein an outer diameter of the upper and lower guide ribs and an inner diameter of the central bore define a second diametral clearance, the second diametral clearance being at least 75% of the first diametral clearance to accommodate thermal expansion of the sleeve; wherein the upper and lower guide ribs are separated by an intermediate portion of the sleeve, the intermediate portion defining an outer diameter less than the outer diameter of the upper and lower guide ribs;

wherein the pump body further defines a vertical relief path that extends parallel to a lengthwise axis of the central bore, the drain port interconnecting the central bore and the vertical relief path.

17. The fuel pump of claim 16, wherein the drain port is angled upwardly relative to the lengthwise axis of the central bore.

18. The fuel pump of claim 17, wherein the vertical relief path is in fluid communication with a damper volume having a pulsation damper therein.

* * * * *